Jan. 19, 1943.     W. C. BUCKNAM     2,308,643
VALVE
Filed Jan. 13, 1938

INVENTOR
WORTHY C. BUCKNAM
BY
ATTORNEY

Patented Jan. 19, 1943

2,308,643

UNITED STATES PATENT OFFICE 2,308,643

VALVE

Worthy C. Bucknam, Mechanic Falls, Maine, assignor, by mesne assignments, to Union Carbide and Carbon Corporation, a corporation of New York Application January 13, 1938, Serial No. 184,791

7 Claims. (Cl. 137—78)

This invention relates to valves, and more particularly to an improved reducing valve interposed between a pressure regulator and a source of fluid under high pressure to throttle the initial high pressure of fluid issuing from said source.

Commercial gases are usually stored in cylinders or other suitable containers under relatively high pressure. When these gases are to be used with various pieces of apparatus, such as oxy-acetylene blowpipes, for example, the desired operating pressure of the gas in the apparatus is maintained by a pressure regulator connected in the line between the gas supply and the apparatus. These pressure regulators are usually diaphragm-operated, built to withstand a certain pressure, and permit the gas to pass through the regulator to the apparatus at a predetermined pressure. If the valve on the gas cylinder or other container is initially opened too quickly due to carelessness, inadvertence or mistake, gas issues therefrom with rapidly increasing pressure. The sudden rush of high pressure gas to the regulator and the resultant high temperature due to the heat of compression within the regulator may cause rupture of the regulator diaphragm and damage to other parts of the regulator. For these reasons, it is desirable to provide some means between the regulator and the gas supply to partially throttle this initial rush of gas so that pressure within the regulator will build up more slowly to the desired operating value.

It is therefore an object of this invention to provide mechanism adapted to establish communication between a source of supply of fluid under relatively high pressure and a regulator, which mechanism includes means operable to restrict the initial flow of fluid from said source of supply for a sufficient period to permit the pressure at the inlet of such regulator to increase gradually to the full pressure of the fluid in said source of supply. Another object is to provide a valve assembly which is so interlocked with the valve controlling the gas supply that this valve may not be opened unless the valve assembly is operative to restrict the flow of fluid from the gas supply to the regulator; and which is simple in construction, economical to manufacture and readily adaptable to use with various forms of gas containers, regulators and other apparatus.

Figure 1:
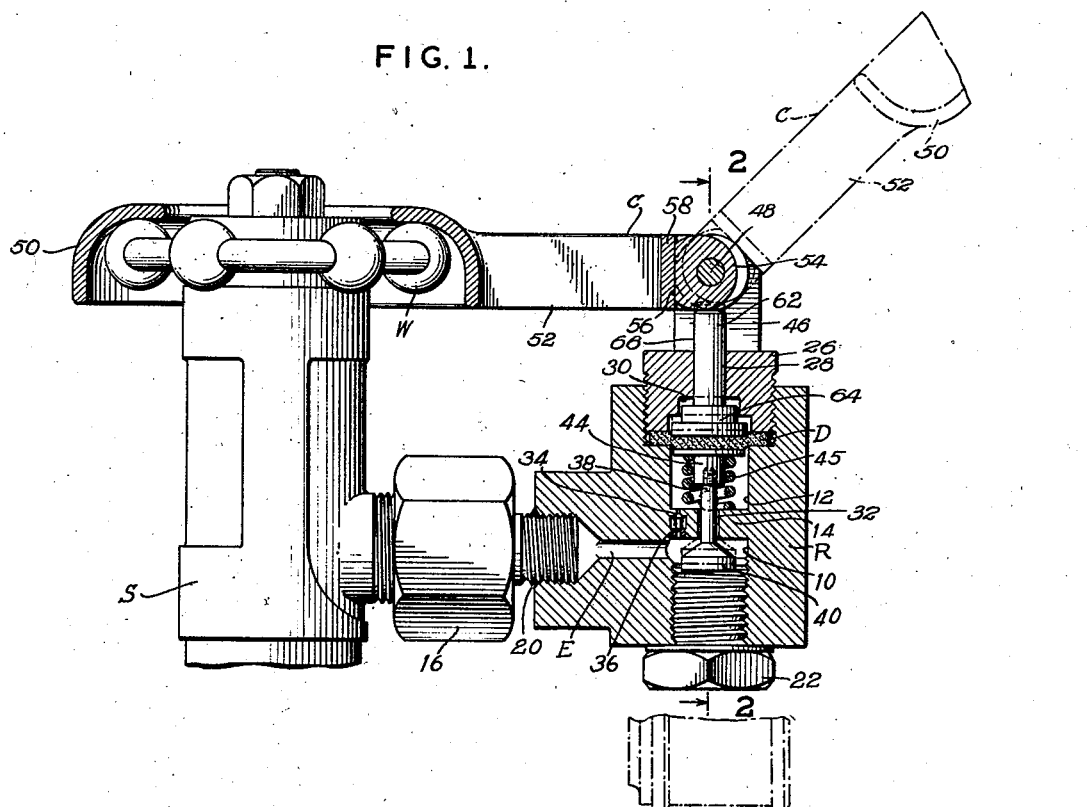
Figure 2:
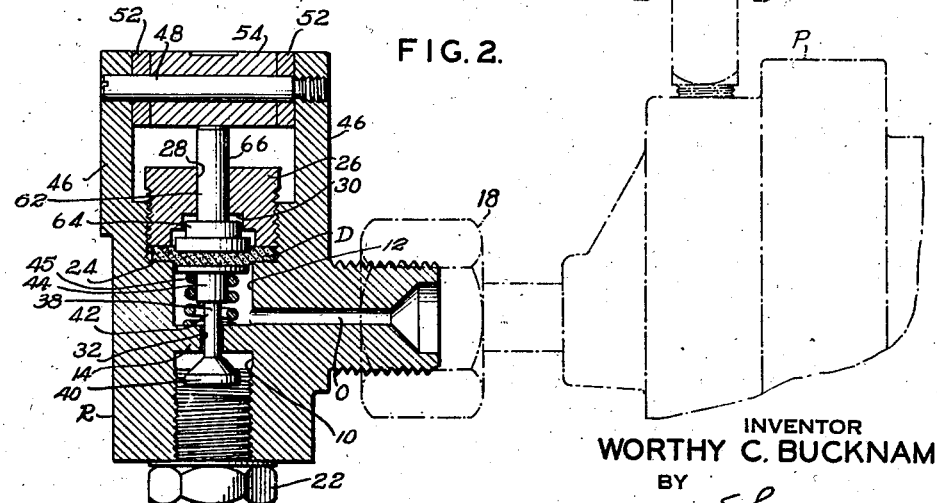

These and other objects of the invention will in part be obvious and in part be apparent from the following description and the accompanying drawing, in which:

Fig. 1 is a transverse section through one form of valve assembly embodying the invention, showing the valve assembly attached to a gas cylinder; and Fig. 2 is a section on the line 2—2 of Fig. 1.

Generally speaking, the invention comprises a cylinder or tank adapted to contain a fluid under relatively high pressure, and having an outlet controlled by a valve and adapted to be connected to the inlet of a pressure regulator by mechanism adapted to establish communication between the cylinder or tank and the regulator. The mechanism includes means operable, upon opening of the cylinder outlet control valve, to restrict the initial flow of fluid from the cylinder or tank to the regulator for a sufficient period of time to permit the fluid pressure at the regulator inlet to build up or increase gradually to the full pressure of the fluid in the cylinder or tank, and means operable, after the inlet pressure attains such full value, to permit substantially unrestricted flow of fluid from the cylinder or tank outlet to the regulator inlet.

One form of apparatus embodying the principles of the invention is shown in Figs. 1 and 2, and comprises a high pressure reducing valve assembly R interposed between a gas cylinder or container S and a pressure regulator P. An element, such as a cage or cover means C forming part of a valve operating mechanism associated with the valve assembly R, is pivotally mounted on the valve assembly R so that it may be swung into and out of covering relation with the operating or control means such as a wheel W associated with the shut-off or control valve of the cylinder or container. When the cage or cover C is in a position covering the wheel W and preventing normal accessibility thereto, as shown in solid lines in Fig. 1, the valve assembly R permits substantially uninterrupted communication between cylinder S and regulator P. In order to operate the valve wheel or handle W to move the cylinder valve, the cage or cover C must be swung clockwise to the position shown in dotted lines in Fig. 1. When the cage is in the latter position, the valve assembly R partially throttles the flow of fluid from cylinder or container S to regulator P, and the valve wheel W may be operated to move the cylinder valve.

The valve assembly R includes a lower chamber or cavity 10 and an upper chamber or cavity 12 separated by a partition 14 forming one wall of each chamber. An inlet passage E extends from the outside of the valve assembly body to the chamber 10 and in the outer end of this inlet passage is secured a nipple 16 connected to the cylinder S. Chamber 10 communicates with regulator P through an outlet passage O to which is secured a second nipple 18 connected to the pressure regulator P. The nipple 16 may be sealed to the reducing valve assembly R by suitable means such as solder 20.

The lower wall of chamber 10 comprises a suitable plug 22; and a flexible diaphragm D held in tight engagement with a shoulder 24 by a plug 26 constitutes the upper wall of chamber 12. The plug 26 is centrally apertured, as at 28, and is formed with a stepped recess 30 for a purpose to be hereinafter described.

The partition 14 is provided with a central opening or port 32 and an offset opening 34, in the latter of which is secured means such as an adjustable bleeder valve 36 permitting limited communication between the chambers 10 and 12 at all times. Communication between the chambers through the opening 32 is controlled by valve means such as a valve 38 consisting of a head 40 disposed in chamber 10 and formed as the lower end of a stem 42 which extends upwardly through the opening 32. On the upper end of stem 42 is threaded an abutment 44 which engages the under side of the diaphragm D. Spring 45 extending between the abutment 44 and the partition 14 normally urges the valve 38 to a closed position.

Spaced parallel arms 46, formed integrally with the upper portion of the body of the valve assembly R, support a pin 48 which is threaded into one of these arms. The cage or device C includes an annular portion 50, adapted to at times cover the valve wheel W, and a pair of integral rearwardly extending arms 52 pivotally mounted on pin 48. Rotatably mounted on pin 48, between arms 52, is a sleeve cam 54 provided with a flat face 56 engaging a cross member 58 integrally connecting arms 52, which cross member prevents cam 54 from turning with respect to cover C. Means such as a plunger 62, which includes a stepped head 64 disposed in the stepped recess 30 and engaging the upper side of diaphragm D, and a stem 66 extending upwardly into engagement with the cam 54, operatively associates the valve 38 and the cage or cover C.

From the above description, the operation of this embodiment of the invention will be apparent. When the cage C is in the position shown in solid lines in Fig. 1, the cam 54 depresses the plunger 62 which engages diaphragm D, forcing the latter downwardly and holding the valve 38 in its open position. The cylinder or container S is now in full communication with the regulator P as gas may pass from cylinder or container S through the nipple 16 and the inlet E to the chamber 10, and thence through the opening 32 into the chamber 12, and through the outlet O and the nipple 18 to the regulator P. Some gas will also pass through the adjustable bleeder valve 36. Assuming that the cylinder valve is closed and it is desirable to supply gas from the container through the regulator P to a gas consuming device such as a blowpipe, the cage or cover C is swung to the position shown in dotted lines in Fig. 1. In this position, the cam 54 permits the spring 45 to force the valve 38, the diaphragm D and the plunger 62 to an upper position, in which the head 40 of the valve 38 engages the opening 32 to prevent any communication between the chambers 10 and 12 through this opening. However, under these conditions, a limited flow of gas from chamber 10 to chamber 12 is permitted by the adjustable bleeder valve 36. If the cylinder valve should now remain open, pressure will build up slowly in the regulator P, as the pressure of gas passing from the chamber 10 to the chamber 12 will be throttled by valve 36.

While specific embodiments of the novel features of the invention have been shown, the invention may be otherwise embodied and the relative dimensions and interrelation of parts changed, provided the objects of the invention are attained.

What is claimed is:

1. In combination, a valve assembly having an inlet and an outlet; a first valve controlling communication between said inlet and said outlet; a device for operating said first valve; a second valve operatively associated with said inlet and controlling the flow of fluid therethrough; means for operating said second valve; means connected to said device and cooperating with such valve operating means to prevent normal accessibility to the latter when said first valve is in the open position; and means disposed between said inlet and said outlet and providing restricted communication therebetween when said first valve is in the closed position.

2. The combination claimed in claim 1, wherein said means disposed between said inlet and said outlet and providing restricted communication therebetween when said first valve is in the closed position includes an adjustable bleeder valve.

3. In combination, a control valve; means for operating said control valve; a valve assembly having an inlet operatively associated with said control valve, an outlet, and a partition separating said inlet and outlet and formed with a port therein; valve means operatively associated with said port and controlling communication between said inlet and outlet through said port; mechanism for operating said valve means and adapted to be associated with said operating means for preventing normal accessibility to said operating means when said valve means is positioned to provide full communication between said inlet and outlet through said port; and means formed in said partition and providing restricted communication between said inlet and outlet when said valve means is positioned to close said port and said operating mechanism is disassociated from said operating means.

4. An article of manufacture comprising, in combination, a high pressure valve having a handle for controlling the flow of fluid under high pressure to an outlet, and a fluid-pressure reducing valve connected to said outlet having a control handle adapted to cover said high pressure valve handle to inhibit conventional manipulation thereof while rendering said pressure reducing valve operative to provide substantially unrestricted flow therethrough, the arrangement being such that, when said pressure reducing valve control handle is moved to render said pressure reducing valve operative to provide restricted flow only therethrough, said high pressure valve handle is uncovered for conventional manipulation.

5. In combination, a body having two cavities and a partition separating said cavities; an opening in said partition; a first valve controlling said opening; a second opening in said partition; an adjustable bleeder valve mounted in said second opening; spaced arms extending from said body;

a cam rotatably mounted between said arms; means mounted in said body and engaged by said cam for operating said first valve; means operable to control the flow of fluid to said body; and means connected to said cam and adapted to at times cooperate with such controlling means to substantially prevent normal accessibility to such controlling means when said first valve is in the open position.

6. In combination, a valve assembly having an inlet, an outlet, and a partition separating said inlet and outlet, said partition having an opening therein; a first valve controlling said opening; a second valve operatively associated with said inlet and controlling the flow of fluid therethrough; operating means for said second valve; mechanism for maintaining said first valve in the open position, said mechanism having normal-accessibility-preventing engagement with said operating means when said first valve is in the open position to prevent operation of said second valve, and being disengaged from said operating means when said first valve is in a position closing said opening; and means providing restricted communication between said inlet and outlet when said first valve is in a position closing said opening.

7. The combination of a cylinder or tank adapted to contain fluid at a relatively high pressure and having an outlet; a valve controlling the discharge of such fluid through said outlet; a fluid pressure regulator having an inlet; and mechanism adapted to establish communication between said outlet and said inlet, such mechanism including means operable, during opening of said valve, to restrict the initial flow of fluid from said cylinder or tank to said regulator for a sufficient period until the fluid pressure at the inlet of said regulator has built up gradually to substantially the relatively high full pressure of the fluid in said cylinder or tank, and means operable, after said inlet pressure attains such relatively high full value, to provide substantially unrestricted flow of fluid from said cylinder or tank to said regulator; said last-named means comprising a valve which is temporarily closed while the fluid pressure builds up to such relatively high full value at the regulator inlet, and a device manually operable to open such temporarily closed valve to provide such unrestricted flow of fluid, said device normally co-operating with such cylinder outlet control valve to obstruct the opening of the latter valve while such temporarily closed valve is open.

WORTHY C. BUCKNAM.